(12) United States Patent
Kao

(10) Patent No.: US 11,691,371 B2
(45) Date of Patent: Jul. 4, 2023

(54) METHOD FOR MANUFACTURING ARTIFICIAL LEATHER SHOE UPPER

(71) Applicant: ZHONG QIANG YI TECHNOLOGY CO., LTD., Taichung (TW)

(72) Inventor: Tzu-Chiang Kao, Taichung (TW)

(73) Assignee: Zhong Qiang Yi Technology Co., Ltd., Taichung (TW)

( * ) Notice: Subject to any disclaimer, the term of this patent is extended or adjusted under 35 U.S.C. 154(b) by 557 days.

(21) Appl. No.: 16/802,972

(22) Filed: Feb. 27, 2020

(65) Prior Publication Data

US 2021/0267317 A1 Sep. 2, 2021

(51) Int. Cl.
| | | |
|---|---|---|
| *B29D 35/14* | (2010.01) | |
| *A43B 23/02* | (2006.01) | |
| *A43D 8/00* | (2006.01) | |
| *A43D 8/02* | (2006.01) | |
| *A43D 8/22* | (2006.01) | |
| *B29C 59/02* | (2006.01) | |
| *B29C 51/10* | (2006.01) | |
| *A43D 95/06* | (2006.01) | |
| *A43D 8/26* | (2006.01) | |
| *B29C 51/42* | (2006.01) | |

(52) U.S. Cl.
CPC ........ *B29D 35/146* (2013.01); *A43B 23/0255* (2013.01); *A43D 8/003* (2013.01); *A43D 8/02* (2013.01); *A43D 8/22* (2013.01); *B29C 51/10* (2013.01); *B29C 59/026* (2013.01); *A43B 23/0215* (2013.01); *A43D 8/26* (2013.01); *A43D 95/06* (2013.01); *B29C 51/42* (2013.01); *B29K 2883/00* (2013.01)

(58) Field of Classification Search
CPC ........... A43D 8/22; A43D 8/24; B29D 35/146
See application file for complete search history.

(56) References Cited

U.S. PATENT DOCUMENTS

| | | | |
|---|---|---|---|
| 6,299,962 B1 * | 10/2001 | Davis | B29C 33/306 36/129 |
| 10,426,227 B2 * | 10/2019 | Lee | A43B 23/0235 |
| 10,905,197 B2 * | 2/2021 | Lee | B29D 35/0072 |
| 2017/0071291 A1 * | 3/2017 | Follet | A43B 23/0235 |

FOREIGN PATENT DOCUMENTS

| | | | | |
|---|---|---|---|---|
| CN | 203485530 U | * | 3/2014 | |
| CN | 104249451 A | * | 12/2014 | |
| CN | 108819180 A | * | 11/2018 | B29C 51/10 |
| CN | 108819198 A | * | 11/2018 | B29C 59/02 |
| TW | 202015883 A | * | 5/2020 | |

OTHER PUBLICATIONS

FIT translation of CN-108819180-A (Year: 2018).*
FIT translation of CN-104249451-A (Year: 2018).*

* cited by examiner

*Primary Examiner* — Benjamin A Schiffman
(74) *Attorney, Agent, or Firm* — Rosenberg, Klein & Lee

(57) ABSTRACT

The present invention discloses a method for manufacturing an artificial leather shoe upper which comprises steps of preparing plural pieces of artificial leather upper material, setting a thermoforming machine, placing the plural pieces of artificial leather upper material in the thermoforming machine, pumping out excess air of a lower die block of the thermoforming machine, thermoforming the plural pieces of artificial leather upper material to obtain a semi-finished product, and demoulding, image recognition, laser cutting and coloring the semi-finished product to obtain the artificial leather shoe upper.

10 Claims, 5 Drawing Sheets

METHOD FOR MANUFACTURING ARTIFICIAL LEATHER SHOE UPPER

BACKGROUND OF THE INVENTION

1. Field of the Invention

The present invention relates to a method for manufacturing an artificial leather shoe upper by thermoforming of plural sheets of artificial leather upper material together, so as to effectively increase manufacturing efficiency and yield and decrease manpower needed.

2. Description of Related Art

People wear shoes to protect feet from abrasion or stabbing by rough and hard ground, stones or other stuffs on the ground when walking or running. In addition, wearing shoes also keeps feet of people clean and healthy. Different kinds of shoes are gradually evolved from straw sandals, clogs in early years to shoes made of different materials nowadays such as cloth shoes or leather shoes. The styles and the colors of the shoes nowadays are also innovated so the shoes nowadays comprise more styles and beautiful appearances.

Although the different types of shoes described above achieve effects of protecting the feet and keeping the feet clean, the conventional methods of manufacturing the shoes still have disadvantages. For instance, the conventional method needs to sew plural pieces of materials together to manufacture a shoe upper which is inconvenient and time-consuming. Therefore, the conventional methods of manufacturing the shoes need to be improved.

SUMMARY OF THE INVENTION

The present invention discloses a method for manufacturing an artificial leather shoe upper by thermoforming of plural sheets of artificial leather upper material together, so as to effectively increase manufacturing efficiency and yield and decrease manpower needed.

DETAILED DESCRIPTION OF THE PREFERRED EMBODIMENT

Figure 1:
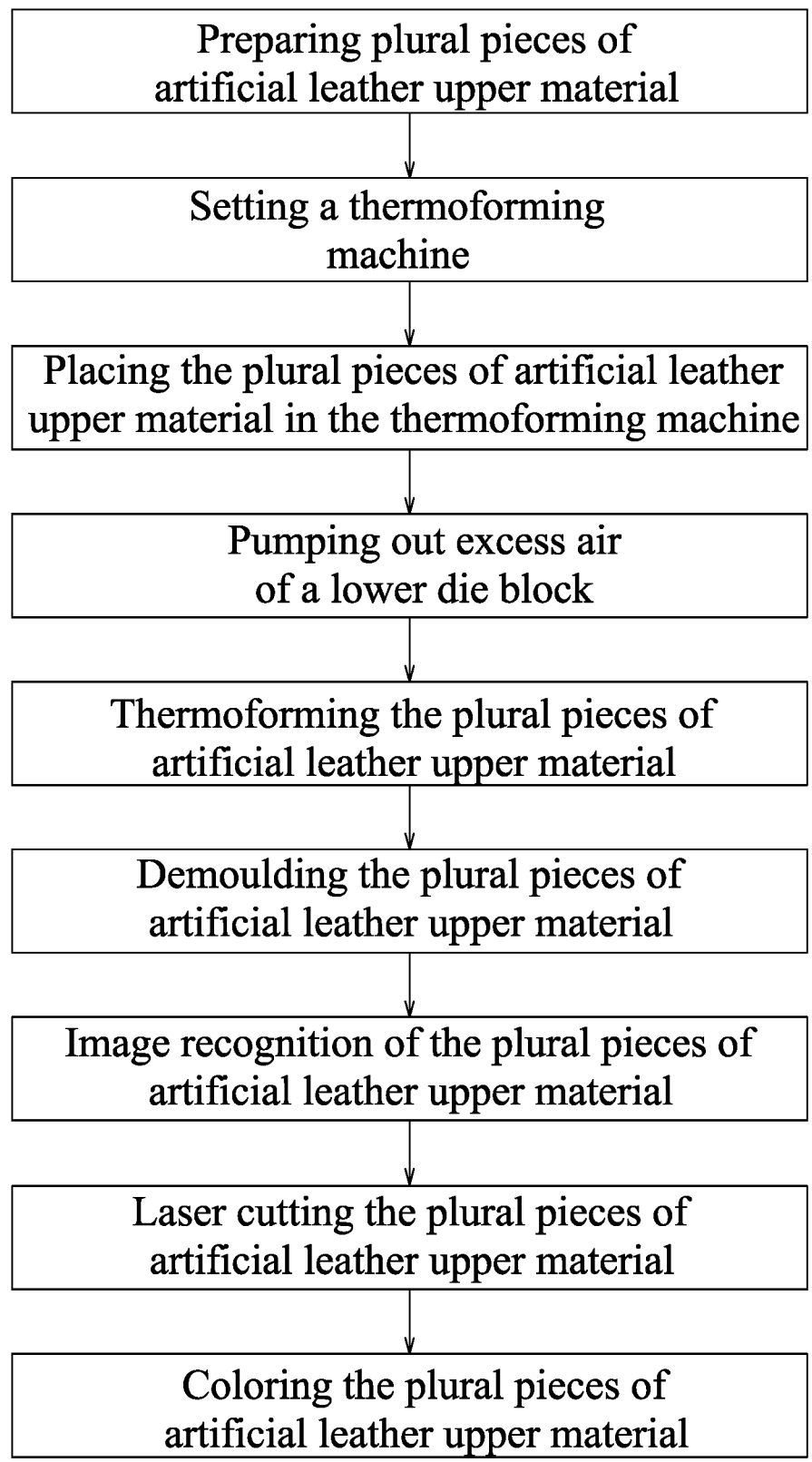
FIG. 1 is a flow chart showing a method for manufacturing an artificial leather shoe upper of the present invention.
Figure 2:
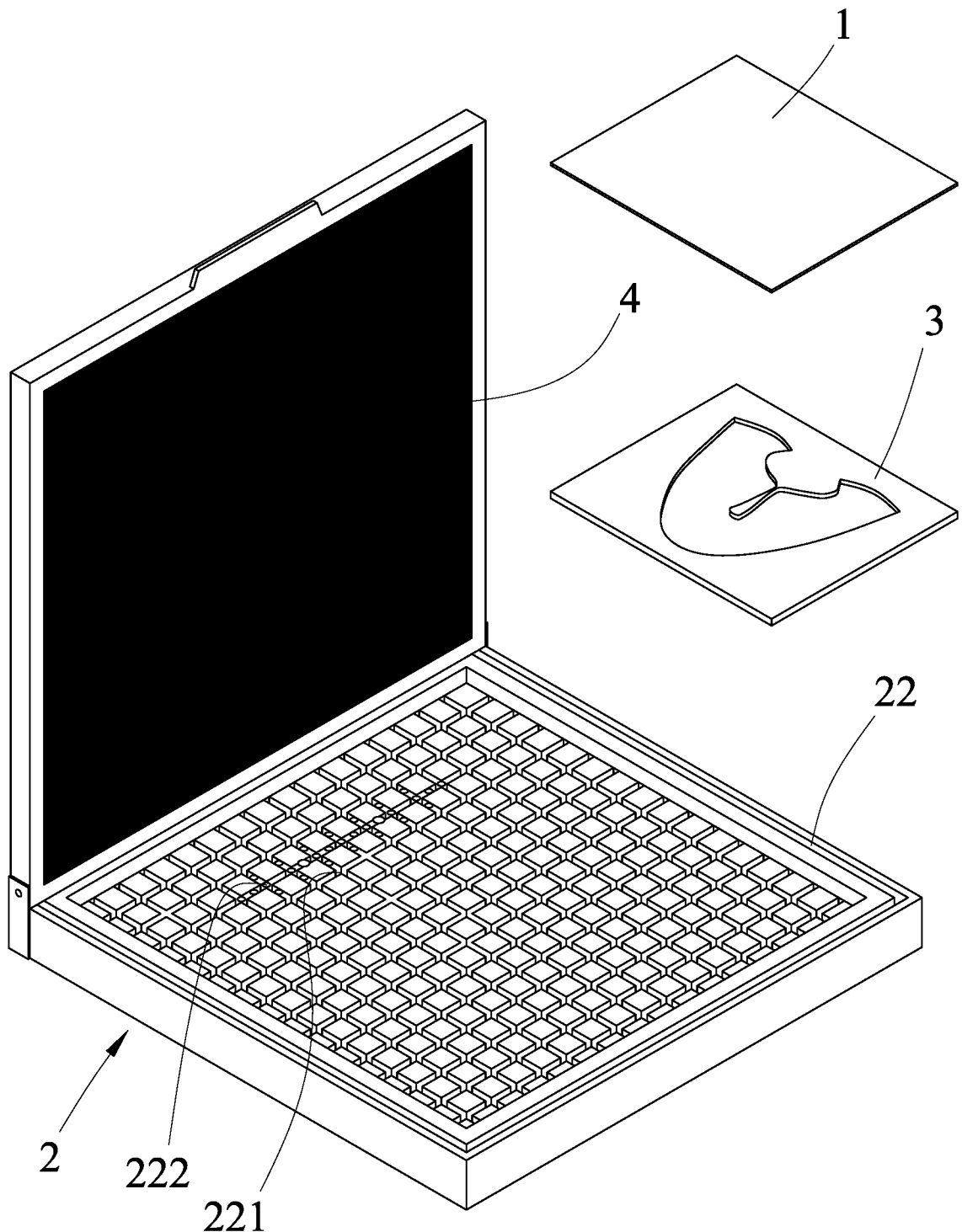
FIG. 2 is a stereogram showing a thermoforming machine of the present invention.
Figure 3:
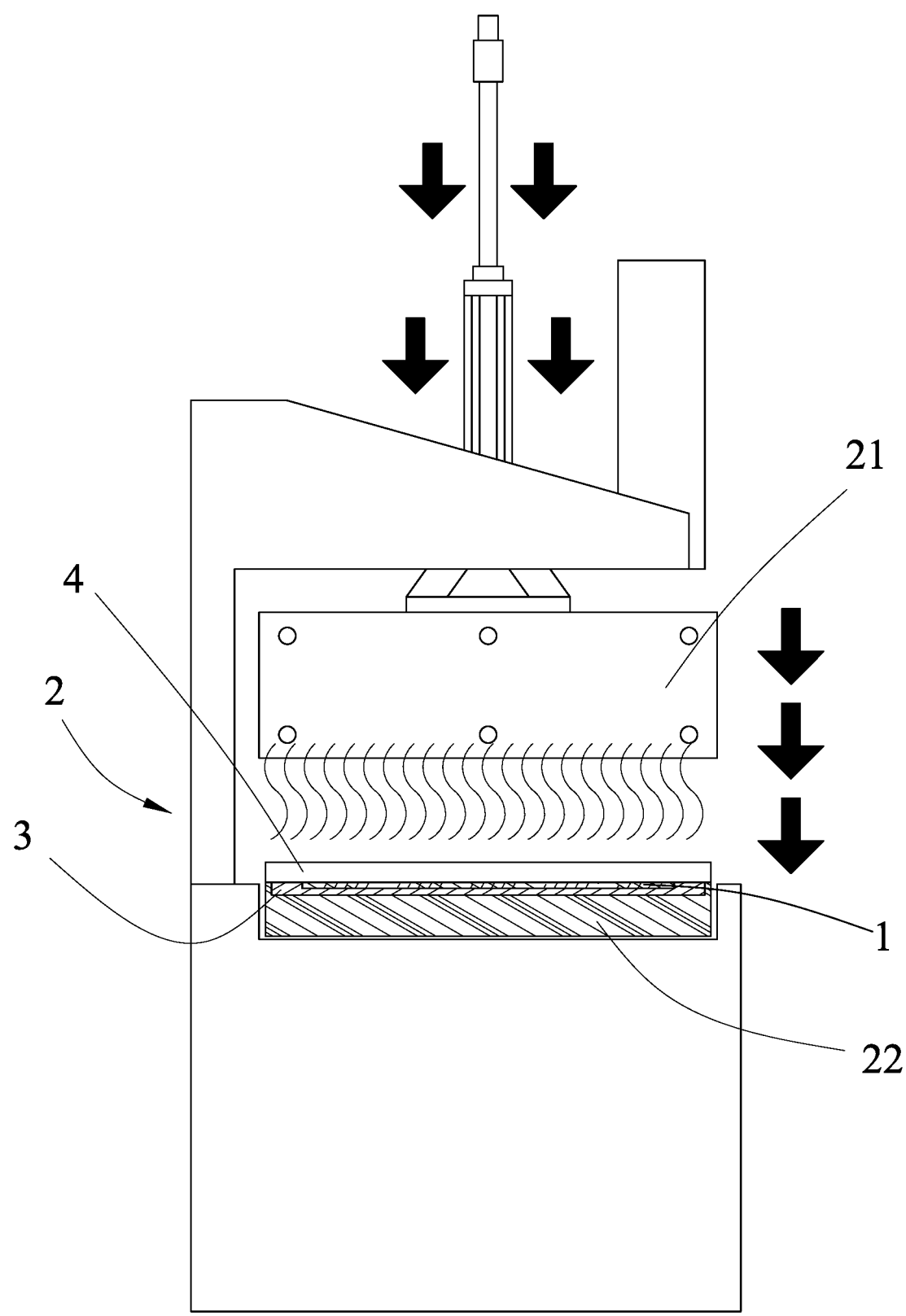
FIG. 3 is a sectional diagram showing a thermoforming machine manufacturing an artificial leather shoe upper of the present invention.

Referring to FIG. 1, FIG. 2 and FIG. 3, a flow chart showing a method for manufacturing an artificial leather shoe upper, a stereogram showing a thermoforming machine and a sectional diagram showing the thermoforming machine manufacturing an artificial leather shoe upper of the present invention are disclosed.

The method for manufacturing an artificial leather shoe upper of the present invention comprises steps of:

(A) Material preparation: Plural pieces of artificial upper material of a size needed are prepared.

(B) Setting a thermoforming machine: A working temperature and a reaction time of a thermoforming machine (2) are set. The thermoforming machine (2) has an upper die block (21) and a lower die block (22) for heating. The upper die block (21) and the lower die block (22) are respectively heated by at least one tubular electric heating element, and at least one metal thermal conducting sheet is respectively disposed between the at least one tubular electric heating element and the upper die block (21) and between the at least one tubular electric heating element and the lower die block (22) for maintaining a uniform temperature of a thermal conducting area of the upper die block (21) and the lower die block (22). The lower die block (22) has plural thermal dissipation grooves (221) interlaced with each other and arranged on the lower die block (22), and the thermal dissipation grooves (221) disposed at an upper middle position of the lower die block (22) have plural thermal dissipation holes (222) respectively. The plural dissipation holes (222) comprise two large thermal dissipation holes (222) and 30 small thermal dissipation holes (222), and each of the thermal dissipation holes (222) is communicated with a vacuum pump. The lower die block (22) is provided with an upper pattern mold (3) thereon. The upper pattern mold (3) is removable and made of a ceramic material.

(C) Placing the artificial upper material: Plural pieces of artificial leather upper material (1) are placed flatly and closely on the upper pattern mold (3) by front surfaces thereof as the temperature of the upper die block (21) and the lower die block (22) reaches the working temperature. An air insulation plate (4) is then covered on back surfaces of the plural pieces of artificial leather upper material (1) and the lower die block (22) for completely insulating the air and flattening the plural pieces of artificial leather upper material (1).

(D) Pumping out the air from the lower die block (22): The vacuum pump communicated with the plural thermal dissipation holes (222) of the lower die block (22) is activated for pumping out excess air of the lower die block (22) to maintain a vacuum state of the plural pieces of artificial leather upper material (1) on the upper pattern mold (3) for staying the plural pieces of artificial leather upper material (1) flatly and stably on the upper pattern mold (3). Step (D) also enhances thermal dissipation efficiency and maintains the upper pattern mold (3) in a stable temperature so as to prevent rapture of the plural pieces of artificial leather upper material (1) and cracked of the upper pattern mold (3) due to high temperature.

(E) Thermoforming: The upper die block (21) of the thermoforming machine (2) is pressed on the lower die block (22) to heat and shape the plural pieces of artificial leather upper material (1) on the upper pattern mold (3). The plural pieces of artificial leather upper material (1) is soften due to increased temperature and a pattern is formed corresponding to the upper pattern mold (3) at the front surfaces of the plural pieces of artificial leather upper material (1). The plural pieces of artificial leather upper material (1) are stacked together to form a height drop therebetween to obtain a semi-finished product.

(F) Demoulding: After the thermoforming machine (2) is heated for the reaction time, the upper die block (21) is separated from the lower die block (22). The vacuum pump is turned off, and the air insulation plate (4) is blown by a high-pressure air gun by a worker for cooling, and the air insulation plate (4) is removed to release an air insulation state. The semi-finished product is lifted by a corner of an edge thereof and blown by the high-pressure air gun. The high pressure air of the high-pressure air gun cools the semi-finished product formed by the plural pieces of artificial leather upper material (1) and preventing deformation of the semi-finished product. In addition, the high pressure air of the high-pressure air gun accelerates separation of the semi-finished product and the upper pattern mold (3) for demoulding so as to decrease placement time of the semi-finished product on the upper pattern mold (3) for lowering defect rate of the semi-finished product.

(G) Image recognition: After demoulding, the semi-finished product is positioned for scanning by a charge-coupled device (CCD) image recognition process for determining a size of at least one coloring area and locations of at least one ventilation hole, at least one positioning hole and excess wastes thereof. The CCD image recognition process decreases false judgments cause by artificial visual identification, lowers operating time and increases productivity.

(H) Laser cutting: The semi-finished product after the image recognition process is processed by a laser cutting process to remove the excess wastes thereof. The at least one ventilation hole and the at least one positioning hole are also punched on the semi-finished product by the laser cutting process. The laser cutting process also lowers operating time and increases productivity.

(I) Coloring: The semi-finished product is placed on a positioning template and printed by a 3-dimensional (3D) curved surface printing machine for coloring the at least one coloring area precisely. The printed semi-finished product is then removed from the positioning template to obtain the artificial leather shoe upper. Since the semi-finished product is printed after the thermoforming process and cooling, the at least one coloring area is positioned accurately. In addition, a structure of the ink printed on the semi-finished product is not spoiled so as to prevent color difference. Therefore, a color fastness, an abrasion resistance and a twist and turns resistance of the semi-finished product formed by the plural pieces of artificial leather upper material (1) meets the requirement of a standard value of the footwear company.

Figure 4:
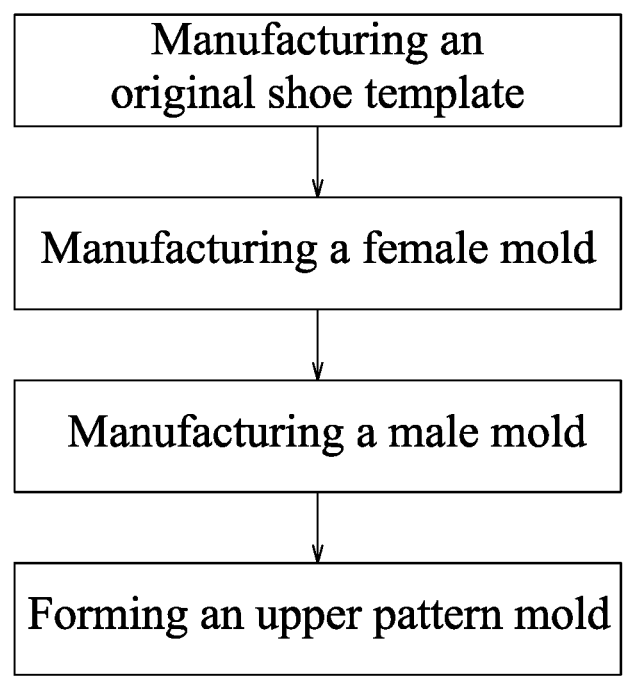
FIG. 4 is a flow chart showing a method for manufacturing an upper pattern mold of the present invention.

Please referring to FIG. 4, the upper pattern mold (3) is manufactured by steps of:

(a). selecting a grain leather material, cutting plural pieces of required size from the grain leather material, and sewing the plural pieces of the grain leather material together to obtain an original shoe template;

(b). manufacturing a female mold by imprinting the original shoe template with a silicone resin;

(c). manufacturing a male mold by imprinting the female mold of a silicone resin; and (d). forming the upper pattern mold (3) by the male mold.

Figure 5:
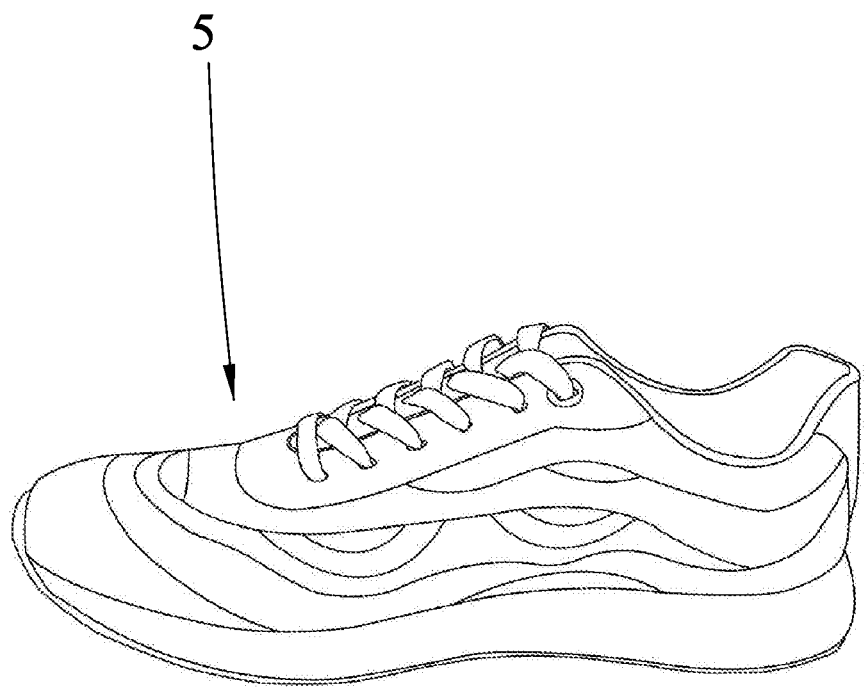
FIG. 5 is a stereogram showing a shoe produced by the present invention.

Accordingly, the artificial leather shoe upper manufactured by the present invention is utilized to make a shoe (5) as shown in FIG. 5.

The present invention provides a method for manufacturing an artificial leather shoe upper by thermoforming of plural sheets of artificial leather upper material integrally, which is convenient and easy for manufacturing a shoe upper. In addition, the present invention also increases the manufacturing efficiency and yield and decrease manpower needed.

What is claimed is:

1. A method for manufacturing an artificial leather shoe upper, comprising steps of:
(A) preparing plural pieces of artificial leather upper material of a size needed;
(B) setting a working temperature and a reaction time of a thermoforming machine having a upper die block and a lower die block for heating, wherein the lower die block has plural thermal dissipation grooves each having plural thermal dissipation holes communicated with a vacuum pump, and wherein the lower die block is provided with a removable upper pattern mold thereon;
(C) placing the plural pieces of artificial leather upper material flatly and closely on the upper pattern mold by front surfaces of the plural pieces of artificial leather upper material towards the upper pattern mold as a temperature of the upper die block and the lower die block reaches the working temperature, and covering an air insulation plate on back surfaces of the plural pieces of artificial leather upper material and the lower die block for completely insulating the air and flattening the plural pieces of artificial leather upper material;
(D) activating the vacuum pump communicated with the plural thermal dissipation holes of the lower die block for pumping out excess air of the lower die block to maintain the plural pieces of artificial leather upper material flatly and stably on the upper pattern mold;
(E) thermoforming the plural pieces of artificial leather upper material on the upper pattern mold to soften the plural pieces of artificial leather upper material and form a pattern at the front surface of the plural pieces of artificial leather upper material and corresponding to the upper pattern mold by pressing and heating the upper die block on the lower die block, thus forming a semi-finished product having the pattern formed on the plural pieces of artificial leather upper material;
(F) separating the upper die block from the lower die block after the thermoforming machine is heated for the reaction time, turning off the vacuum pump and removing the air insulation plate after cooling down to release an air insulation state, and demoulding the semi-finished product from the upper pattern mold;
(G) fixed position scanning the semi-finished product by an image recognition process for determining a size of at least one coloring area and locations of at least one ventilation hole, at least one positioning hole and excess wastes thereof;
(H) laser cutting the semi-finished product after the image recognition process to remove the excess wastes thereof, and punching the at least one ventilation hole and the at least one positioning hole thereon; and
(I) placing the semi-finished product on a positioning template and using a 3-dimensional curved surface printing machine for precisely coloring the at least one coloring area, and removing the printed semi-finished product from the positioning template to obtain the artificial leather shoe upper.

2. The method for manufacturing an artificial leather shoe upper as claimed in claim 1, wherein the upper die block and the lower die block are respectively heated by at least one tubular electric heating element.

3. The method for manufacturing an artificial leather shoe upper as claimed in claim 2, wherein at least one metal thermal conducting sheet is respectively disposed between the at least one tubular electric heating element and the upper die block and between the at least one tubular electric heating element and the lower die block for maintaining a uniform temperature of a thermal conducting area of the upper die block and the lower die block.

4. The method for manufacturing an artificial leather shoe upper as claimed in claim 1, wherein the plural thermal dissipation grooves are interlaced with each other and arranged on the lower die block.

5. The method for manufacturing an artificial leather shoe upper as claimed in claim 1, wherein the upper pattern mold is made of a ceramic material.

6. The method for manufacturing an artificial leather shoe upper as claimed in claim 5, wherein the upper pattern mold is manufactured by steps of:
- (a) selecting a grain leather material suitable for matches, cutting plural pieces of required size from the grain leather material, and sewing the plural pieces of the grain leather material together to obtain an original shoe template;
- (b) manufacturing a female mold by imprinting the original shoe template with a silicone resin;
- (c) manufacturing a male mold by imprinting the female mold of a silicone resin; and
- (d) forming the upper pattern mold by the male mold.

7. The method for manufacturing an artificial leather shoe upper as claimed in claim 1, wherein the upper pattern mold is manufactured by steps of:
- (a) selecting a grain leather material, cutting plural pieces of required size from the grain leather material, and sewing the plural pieces of the grain leather material together to obtain an original shoe template;
- (b) manufacturing a female mold by imprinting the original shoe template with a silicone resin;
- (c) manufacturing a male mold by imprinting the female mold of a silicone resin; and
- (d) forming the upper pattern mold by the male mold.

8. The method for manufacturing an artificial leather shoe upper as claimed in claim 1, wherein the air insulation plate is made of a silicone material.

9. The method for manufacturing an artificial leather shoe upper as claimed in claim 1, wherein the semi-finished product is lifted by a corner of an edge thereof and blown by a high-pressure air gun for cooling, preventing deformation and accelerating demoulding thereof.

10. The method for manufacturing an artificial leather shoe upper as claimed in claim 1, wherein the semi-finished product is positioned for scanning by a charge-coupled device image recognition process.

* * * * *